United States Patent
Tsai

(10) Patent No.: US 8,872,364 B2
(45) Date of Patent: Oct. 28, 2014

(54) POWER GENERATOR

(75) Inventor: Ming-Chun Tsai, Taoyuan County (TW)

(73) Assignee: Jun-Dong Power Corporation, Taoyuan County (TW)

( * ) Notice: Subject to any disclaimer, the term of this patent is extended or adjusted under 35 U.S.C. 154(b) by 214 days.

(21) Appl. No.: 13/566,177

(22) Filed: Aug. 3, 2012

(65) Prior Publication Data

US 2013/0285387 A1    Oct. 31, 2013

(30) Foreign Application Priority Data

Apr. 27, 2012   (TW) .............................. 101115212 A

(51) Int. Cl.
*H02K 7/18* (2006.01)

(52) U.S. Cl.
USPC ......................................................... 290/1 C

(58) Field of Classification Search
USPC ..................................... 290/1 C; 310/90, 113
See application file for complete search history.

(56) References Cited

U.S. PATENT DOCUMENTS

| | | | |
|---|---|---|---|
| 5,194,754 A | 3/1993 | Mikami | |
| 6,069,409 A | 5/2000 | Fowler et al. | |
| 7,755,238 B2 * | 7/2010 | Tsai | 310/90 |
| 2010/0019596 A1 * | 1/2010 | Tsai | 310/113 |

FOREIGN PATENT DOCUMENTS

| | | |
|---|---|---|
| JP | 61-196737 A | 8/1986 |
| JP | 11-22628 A | 1/1999 |
| TW | 200827551 A | 7/2008 |
| TW | 201038840 A | 11/2010 |

* cited by examiner

*Primary Examiner* — Tulsidas C Patel
*Assistant Examiner* — Viet Nguyen
(74) *Attorney, Agent, or Firm* — Mintz Levin Cohn Ferris Glovsky and Popeo, P.C.

(57) ABSTRACT

A power generator includes a heavy gyro body, a driving device, a transmission disk and an electricity generation module. The driving device is used to drive the heavy gyro body to rotate about a vertical spindle. The transmission disk is secured to and rotatable simultaneously with the heavy gyro body. The transmission disk has a plurality of rollers at a sidewall thereof. The electricity generation module has a rotation disk, which has a plurality of inclined grooves at a sidewall thereof. Each inclined groove is meshed with a corresponding roller of the transmission disk such that the transmission disk is able to drive the rotation disk to rotate, wherein an included angle between an inner sidewall of each inclined groove and a horizontal plane is more than 0 degree and less than 45 degrees.

6 Claims, 5 Drawing Sheets

POWER GENERATOR

RELATED APPLICATIONS

This application claims priority to Taiwan Application Serial Number 101115212, filed Apr. 27, 2012, which is herein incorporated by reference.

BACKGROUND

1. Field of Invention

The present disclosure relates to a power generator. More particularly, the present disclosure relates to a power generator with a heavy gyro body.

2. Description of Related Art

With the rapid growth in commercial/industrial activities and comfortable living needs in recent years there is a higher demand and dependency on electric power. Currently, electric power is generated mainly from nuclear power, coal, oil, gas, wind, ground heat, and solar energy.

The energy resources on the Earth are continuously exhausted. However, power consumption is increasing every day. Therefore, the environmental demands are increasing and environmental pollution is getting worse. In view of the limited energy resources on the Earth, it is imperative for scientists to find new substitute energy.

Currently, there are pros and cons for nuclear power usage; its further development, in particular, has caused a long-term debate. As to waterpower, most of the water resources have been utilized and the impact of waterpower to nature is always criticized; its future is also very limited. In addition, the environmental pollution and greenhouse effect due to burning coals are not yet solved, either.

Facing foreseeable energy shortages in the future and under the condition of being unable to find new substitute energy, it is of consequence to use any method and mechanism to generate the power to reduce the energy crisis impact for humans.

SUMMARY

It is therefore an objective of the present invention to have a power generator providing stable electricity with high efficiency.

In accordance with the foregoing and other objectives of the present invention, a power generator includes a heavy gyro body, a driving device, a transmission disk and an electricity generation module. The driving device is used to drive the heavy gyro body to rotate about a vertical spindle. The transmission disk is secured to and rotatable simultaneously with the heavy gyro body. The transmission disk has a plurality of roller groups at a sidewall thereof, and each roller group has at least two rollers. The electricity generation module has a rotation disk, which having a plurality of inclined grooves at a sidewall thereof. Each inclined groove is meshed with a corresponding roller group of the transmission disk such that the transmission disk is able to drive the rotation disk to rotate, wherein each roller group has a virtual center connection line in parallel with an inner sidewall of a corresponding inclined groove. An included angle between each virtual center connection line and a horizontal plane is more than 0 degree and less than 45 degrees.

In accordance with the foregoing and other objectives of the present invention, another power generator includes a heavy gyro body, a driving device, a transmission disk and an electricity generation module. The driving device is used to drive the heavy gyro body to rotate about a vertical spindle. The transmission disk is secured to and rotatable simultaneously with the heavy gyro body. The transmission disk has a plurality of rollers at a sidewall thereof. The electricity generation module has a rotation disk, which has a plurality of inclined grooves at a sidewall thereof. Each inclined groove is meshed with a corresponding roller of the transmission disk such that the transmission disk is able to drive the rotation disk to rotate, wherein an included angle between an inner sidewall of each inclined groove and a horizontal plane is more than 0 degree and less than 45 degrees.

In another embodiment disclosed herein, the heavy gyro body further includes a gear ring disposed on a top surface thereof.

In another embodiment disclosed herein, the driving device further includes a plurality of motors meshed with the gear ring.

In another embodiment disclosed herein, the motors are symmetrically arranged relative to the vertical spindle.

In another embodiment disclosed herein, the electricity generation module includes an electricity generation device connected with the rotation disk for converting mechanical energy into electricity energy.

Thus, a heavy gyro body is used to provide a stable mechanical energy, and then the mechanical energy is transmitted to an electricity generation device through a transmission disk and a rotation disk. All approaches in the energy transmission employ rotary movement of machineries, and thereby the energy loss during the energy transmission may decrease. In addition, the rollers are gathered in small groups on the transmission disk to form a larger pitch for the inclined grooves of the rotation disk such that the rotation disk of the electricity generation module can still be meshed with or separated from the transmission disk easily even when the transmission disk is still rotating.

It is to be understood that both the foregoing general description and the following detailed description are by examples, and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention. In the drawings.

DESCRIPTION OF THE PREFERRED EMBODIMENTS

Figure 1:
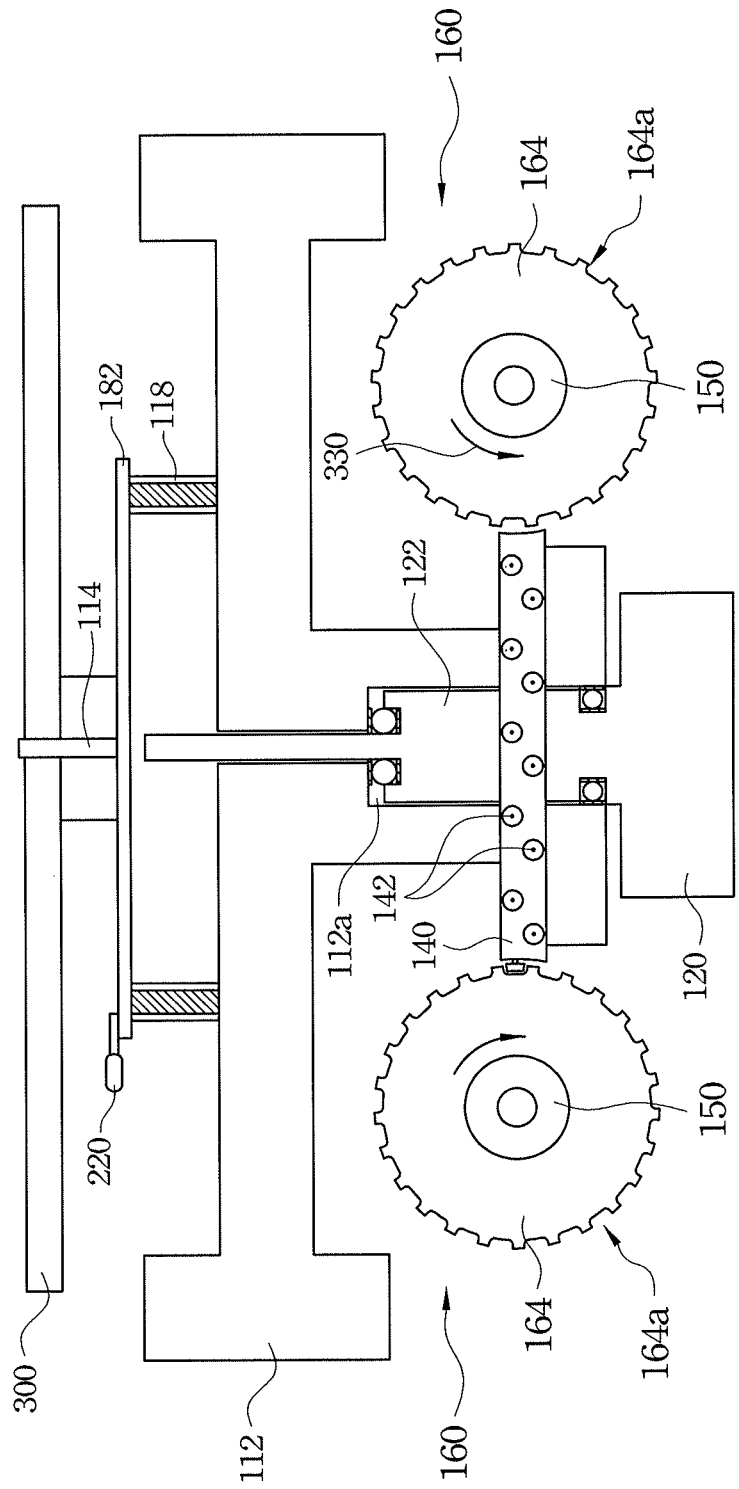
FIG. 1 illustrates a schematic cross-sectional view of a power generator according to one preferred embodiment of this invention.

Reference will now be made in detail to the present preferred embodiments of the invention, examples of which are illustrated in the accompanying drawings. Wherever possible, the same reference numbers are used in the drawings and the description to refer to the same or like parts.

FIG. 1 illustrates a schematic cross-sectional view of a power generator according to one preferred embodiment of this invention. As illustrated in FIG. 1, the power generator includes a heavy gyro body 112, a driving device 200, a transmission disk 140 and a rotation disk 164.

The heavy gyro body 112 includes a gear ring 182 on its top surface, and the gear ring 182 is symmetrically arranged relative to the spindle 114. The gear ring 182 is secured to the heavy gyro body 112 by a connection ring 118. The spindle 114 penetrates the heavy gyro body 112 and serves as a central axis of the heavy gyro body 112. The spindle 114 is a vertical spindle, that is, the spindle 114 is perpendicular to a horizontal ground. Thus, the heavy gyro body 112 rotates about a vertical spindle 114.

The spindle 114 extends upward from a central column 122 of a base 120. The heavy gyro body 112 has a central cavity 112a, which is rotatably connected with the central column 122 of the base 120 by means of bearing, such that the heavy gyro body 112 can rotate about the central column 122 and the spindle 114. The base 120 is used to firmly support the heavy gyro body 112 such that the heavy gyro body 112 is capable of reliably rotating about the spindle 114. In addition, a support frame 300 is further arranged above the heavy gyro body 112 to position a top end of the spindle 114. With the above-mentioned designs, the heavy gyro body 112 is able to reliably rotate upright.

The heavy gyro body 112 may be made of a material having high density such as lead (Pb) and thus has a large mass. Initially, a large amount of energy is required to drive the heavy gyro body 112 to rotate. However, after the heavy gyro body 112 rotates stably, the required energy to maintain the rotation of the heavy gyro body 112 considerably decreases.

Figure 2:
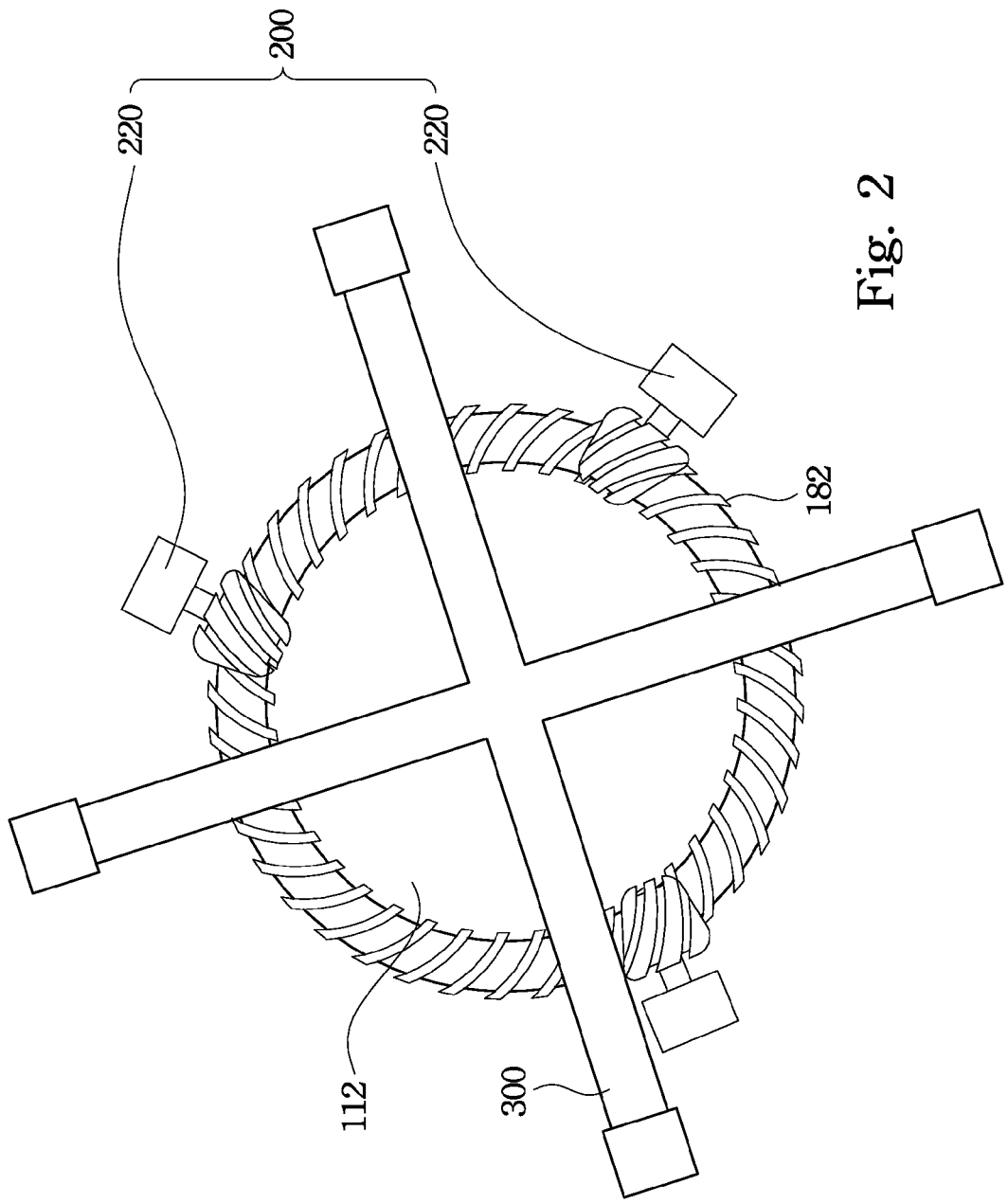
FIG. 2 illustrates a top view of the power generator in FIG. 1.

As illustrated in FIG. 2, the driving device 200 is operable to drive the heavy gyro body 112 to rotate. In this embodiment, the driving device 200 includes three motors 220 connected to the gear ring 182 to provide energy to initially drive or assist the heavy gyro body 112 to rotate. The motors 220 are arranged symmetrically or uniformly relative to the spindle 114. Therefore, the motors 220 may stably drive the heavy gyro body 112 to rotate and the forces provided by the motors 220 are substantially the same. During the initial period of starting the heavy gyro body 112 to rotate, the driving device 200 must supply a larger driving force to make the heavy gyro body 112 into a condition of a satisfactory rotation. In this period, the motors 220 coupled to the gear ring 182 may be used to start the rotary movement of the heavy gyro body 112, and thus the required driving force may decrease. After the rotation of the heavy gyro body 112 reaches a certain speed, the external natural energy (such as wind power or hydraulic power) may be used to maintain the rotation of the heavy gyro body 112.

The transmission disk 140 is arranged at a lower half of the heavy gyro body 112 and rotatable simultaneously with the heavy gyro body 112 along a direction 320. In this embodiment, the direction and speed of the rotation of the transmission disk 140 is the same as these of the heavy gyro body 112. The transmission disk 140 is equipped with a plurality of roller groups 142 at its sidewalls, and each roller group 142 includes at least two rollers. Each roller group 142 is meshed with a corresponding inclined groove 164a of the rotation disk 164 such that the transmission disk 140 may drive the rotation disk 164 into rotating. In this embodiment, the roller group 142 may includes rolling wheels or rolling balls.

The power generator may include an electricity generation device 150 coaxially connected to the rotation disk 164. The electricity generation device 150 may produce electric energy by a rotating mechanism of the rotation disk 164. That is, the transmission disk 140, which simultaneously rotates with the heavy gyro body 112, drives the rotation disk 164 to rotate and the electricity generation device 150 is thus driven to produce electric energy.

In order to input the external natural energy (such as wind power or hydraulic power) into the heavy gyro body 112, the heavy gyro body 112 is usually positioned on top of the transmission disk 140 (as illustrated in FIG. 1), but it is still operable that the heavy gyro body 112 is positioned under the transmission disk 140 (not illustrated in the drawings).

Figure 3:
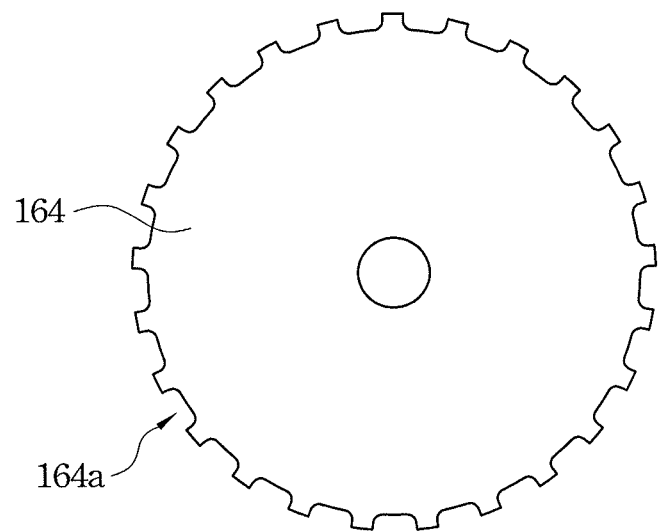
FIG. 3 illustrates an enlarged view of the rotation disk in FIG. 1.
Figure 4:
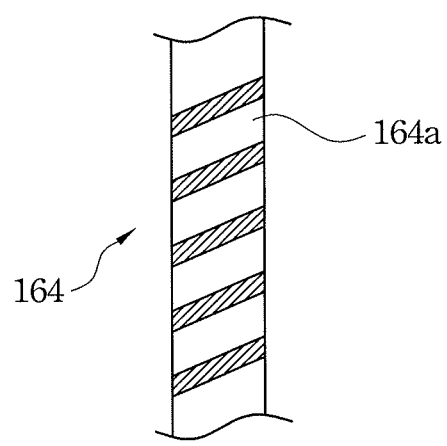
FIG. 4 illustrates a side view of the rotation disk in FIG. 3.
Figure 5:
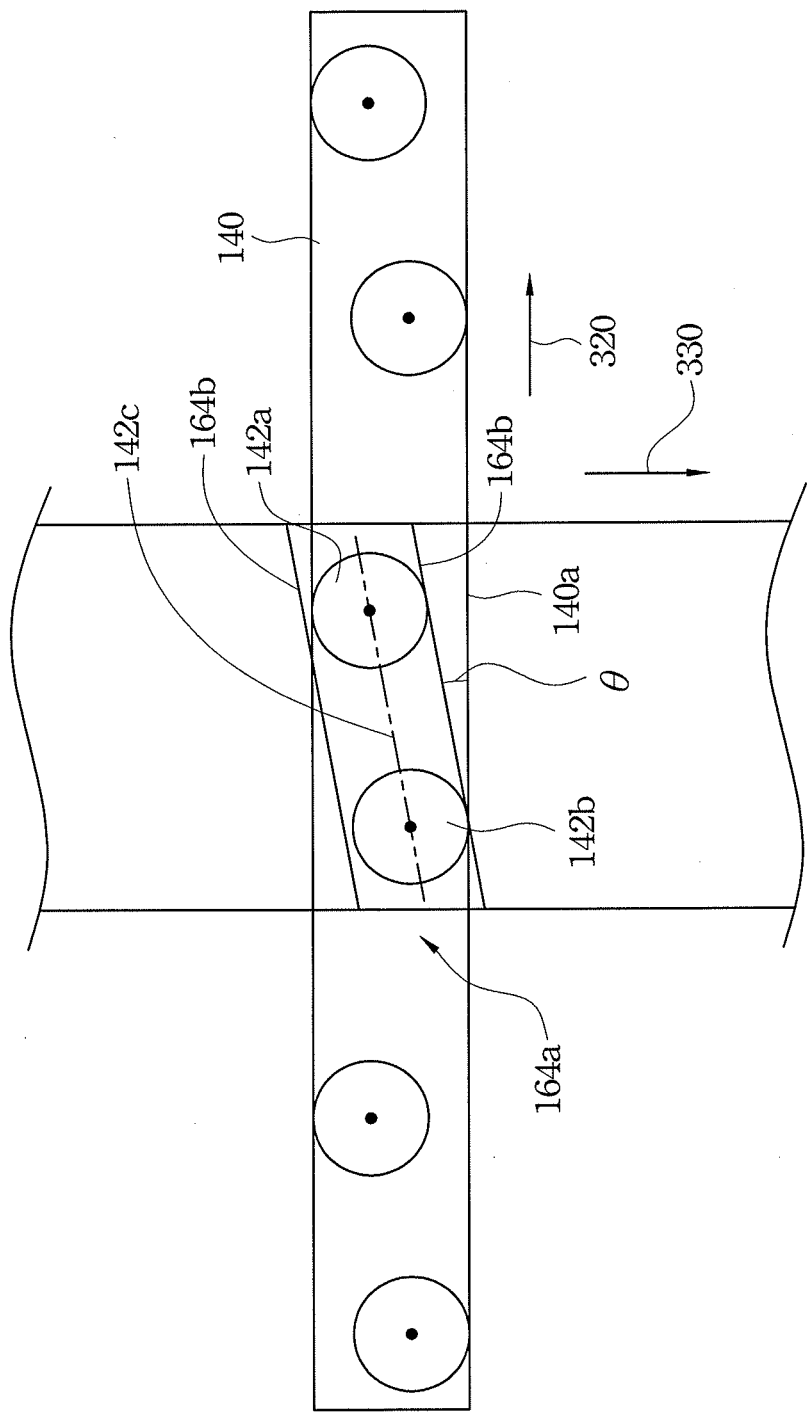
FIG. 5 illustrates a schematic side view of an operation mechanism between a transmission disk and a rotation disk according to one preferred embodiment of this invention.

As illustrated in FIG. 3 and FIG. 4, inclined grooves 164a are designed at a sidewall of the rotation disk 164 to be meshed with the roller groups 142 of the transmission disk 140. In this embodiment, the sizes of the inclined groove 164a are compatible with the sizes of the roller while a pitch between adjacent roller groups 142 is compatible with a pitch between adjacent inclined grooves 164a. When the heavy gyro body 112 drives the transmission disk 140 to rotate, each roller group 142 of the transmission disk 140 is meshed with a corresponding inclined groove 164a of the rotation disk 164 such that the transmission disk 140 can drive the rotation disk 164 to rotate. That is, when the transmission disk 140 rotates along the direction 320, the roller groups 142 of the transmission disk 140 are serially meshed with the corresponding inclined grooves 164a of the rotation disk 164 such that the rotation disk 164 can be driven to rotate along the direction 330 (as illustrated in FIG. 5). Therefore, the heavy gyro body 112 can drive the rotation disk 164 to rotate via the transmission disk 140.

Furthermore, the rollers are gathered in small groups, i.e., each roller group 142, on the transmission disk 140 to form a larger pitch for the roller groups 142 and the inclined grooves 164a of the rotation disk 164, such that the rotation disk 164 of the electricity generation module 160 can be meshed with or separated from the transmission disk 140 easily. Even when the transmission disk 140 is rotating, the rotation disk 164 can still be meshed with or separated from the transmission disk 140 easily. Therefore, when the electricity generation module 160 is damaged or need to be maintained, an old electricity generation module 160 can be separated from the transmission disk 140 and a new electricity generation module 160 can be meshed with the transmission disk 140 while the heavy gyro body 112 and the transmission disk 140 are still rotating. With this regard, the high-speed rotating heavy gyro body 112 needs not to be stopped and restarted when the electricity generation module 160 is taken apart or installed, thereby saving the energy to initially drive the heavy gyro body 112 to rotate.

Figure 6:
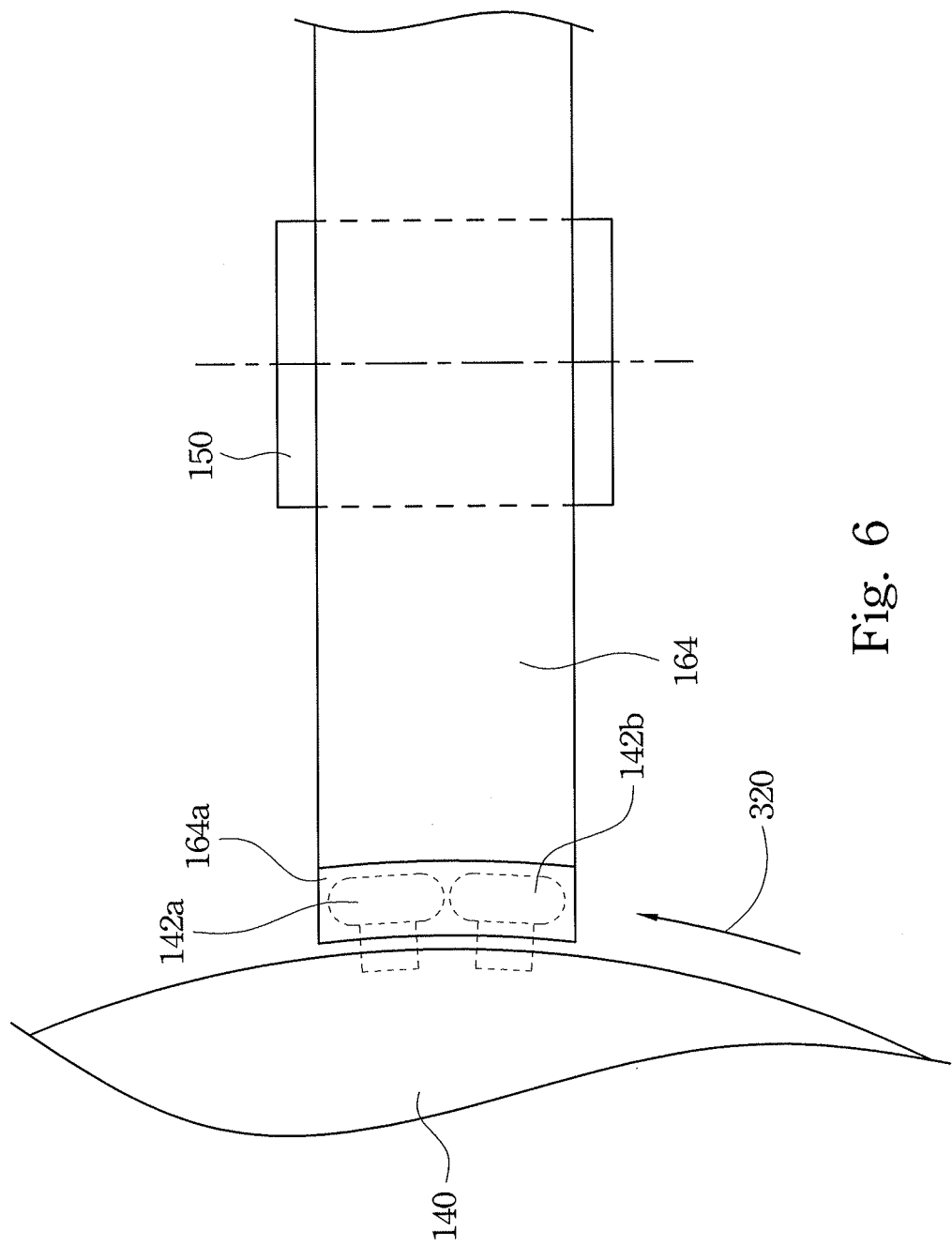
FIG. 6 illustrates a schematic top view of an operation mechanism between a transmission disk and a rotation disk according to one preferred embodiment of this invention.

FIG. 5 illustrates a schematic side view of an operation mechanism between a transmission disk and a rotation disk according to one preferred embodiment of this invention, and FIG. 6 illustrates a schematic top view of an operation mechanism between a transmission disk and a rotation disk according to one preferred embodiment of this invention. When the roller group 142 of the transmission disk 140 is meshed with the corresponding inclined groove 164a of the rotation disk 164, a virtual center connection line 142c formed between adjacent rollers (142a, 142b) is in parallel with an inner sidewall 164b of a corresponding inclined groove 164a. In this embodiment, the rollers (142a, 142b) preferably have convex arc-shaped sidewalls such that the rollers (142a, 142b) can contact the least area of an inner sidewall of the inclined groove 164a, e.g., a point contact between the roller and the inner sidewall of the inclined groove. An included angle θ between an inner sidewall of the inclined groove 164a and a bottom surface 140a (or a top surface) of the transmission disk 140 is more than 0 degree and less than 45 degrees. When the included angle θ is not less than 45 degrees, the energy loss of the roller 142a driving the inner sidewall 164b of the groove 164a to move considerably becomes large. In this embodiment, the bottom surface 140a (or the top surface) of the transmission disk 140 can be regarded as a horizontal plane.

In an alternate embodiment (not illustrated in the drawings), a single roller (142a or 142b) (rather than a roller group including at least two rollers) of the transmission disk 140 is meshed with a corresponding inclined groove 164a of the rotation disk 164. The advantage of using single roller of the transmission disk meshed with a corresponding inclined groove of the rotation disk is to obtain a thinner rotation disk (compared with the rotation disk 164 in FIG. 6) such that the rotation disk can be of lower cost due to less material used to manufacture the rotation disk.

According to the above-discussed embodiments, a heavy gyro body is used to provide a stable mechanical energy, and then the mechanical energy is transmitted to an electricity generation device through a transmission disk and a rotation disk. All approaches in the energy transmission employ rotary movement of machineries, and thereby the energy loss during the energy transmission may decrease. In addition, the rollers are gathered in small groups on the transmission disk to form a larger pitch for the inclined grooves of the rotation disk such that the rotation disk of the electricity generation module can still be meshed with or separated from the transmission disk easily even when the transmission disk is still rotating.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A power generator comprising:
a heavy gyro body;
a driving device being used to drive the heavy gyro body to rotate about a vertical spindle;
a transmission disk being secured to and rotatable simultaneously with the heavy gyro body, the transmission disk having a plurality of roller groups at a sidewall thereof, each roller group having at least two rollers; and
an electricity generation module having a rotation disk, the rotation disk having a plurality of inclined grooves at a sidewall thereof, each inclined groove is meshed with a corresponding one of the roller groups such that the transmission disk is able to drive the rotation disk to rotate, wherein each roller group has a virtual center connection line in parallel with an inner sidewall of a corresponding one of the inclined grooves, wherein the virtual center connection line is a virtual line interconnected between centers of the at least two rollers of each roller group, an included angle between each virtual center connection line and a horizontal plane is more than 0 degree and less than 45 degrees.

2. The power generator of claim 1, wherein the heavy gyro body further includes a gear ring disposed on a top surface thereof.

3. The power generator of claim 2, wherein the driving device further includes a plurality of motors meshed with the gear ring.

4. The power generator of claim 3, wherein the motors are symmetrically arranged relative to the vertical spindle.

5. The power generator of claim 1, wherein the electricity generation module includes an electricity generation device connected with the rotation disk for converting mechanical energy into electricity energy.

6. The power generator of claim 1, wherein the roller is a rolling wheel or a rolling ball.

\* \* \* \* \*